March 11, 1924.

A. COPONY

AUTOMOBILE DECKING DEVICE

Filed Nov. 6, 1919

Inventor

Alfred Copony

By Whittemore Hulbert, and Whittemore

Attorneys

March 11, 1924.

A. COPONY 1,486,636

AUTOMOBILE DECKING DEVICE

Filed Nov. 6, 1919     3 Sheets-Sheet 2

Inventor
Alfred Copony
By Whittemore, Hulbert, and Whittemore
Attorneys

March 11, 1924.

A. COPONY

AUTOMOBILE DECKING DEVICE

Filed Nov. 6, 1919

Inventor
Alfred Copony
By Whittemore, Hulbert & Whittemore
Attorneys

Patented Mar. 11, 1924.

1,486,636

UNITED STATES PATENT OFFICE.

ALFRED COPONY, OF DETROIT, MICHIGAN, ASSIGNOR TO COPONY AUTO LOADING COMPANY, OF DETROIT, MICHIGAN, A CORPORATION OF MICHIGAN.

AUTOMOBILE DECKING DEVICE.

Application filed November 6, 1919. Serial No. 336,209.

*To all whom it may concern:*

Be it known that I, ALFRED COPONY, a citizen of Austria, residing at Detroit, in the county of Wayne and State of Michigan, have invented certain new and useful Improvements in Automobile Decking Devices, of which the following is a specification, reference being had therein to the accompanying drawings.

This invention relates to decking systems for loading automobiles or the like, and refers more particularly to a simplified construction for supporting a motor vehicle at an elevation in a freight car or other conveyance so as to leave room beneath the vehicle so elevated for another motor vehicle. The invention may be considered an improvement upon the disclosure of applicant's Patent #1,254,312 issued January 22, 1918, and 1,336,201 issued April 6th, 1920.

It is the object of the invention to provide a structure for supporting a motor vehicle at an elevation, which structure comprises an axle-engaging member and one or more brace members, provision being made for an adjustment between the axle-engaging member and the brace member or members, to adapt the construction for use in freight cars of different widths and also to facilitate such a location of the wall engaging end of the brace members as will afford the most secure anchorage for said brace member.

Figure 1:
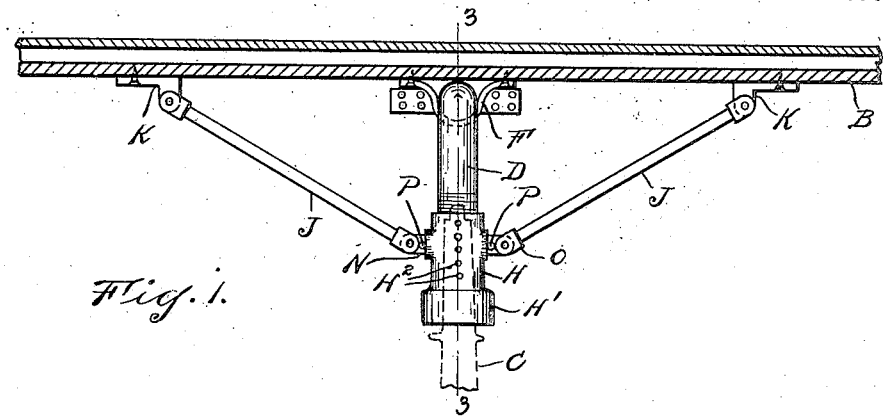
Figure 1 is a plan view of one form of the invention, showing the application of the same to a freight car and indicating the axle of the supported vehicle in dash lines.
Figure 2:
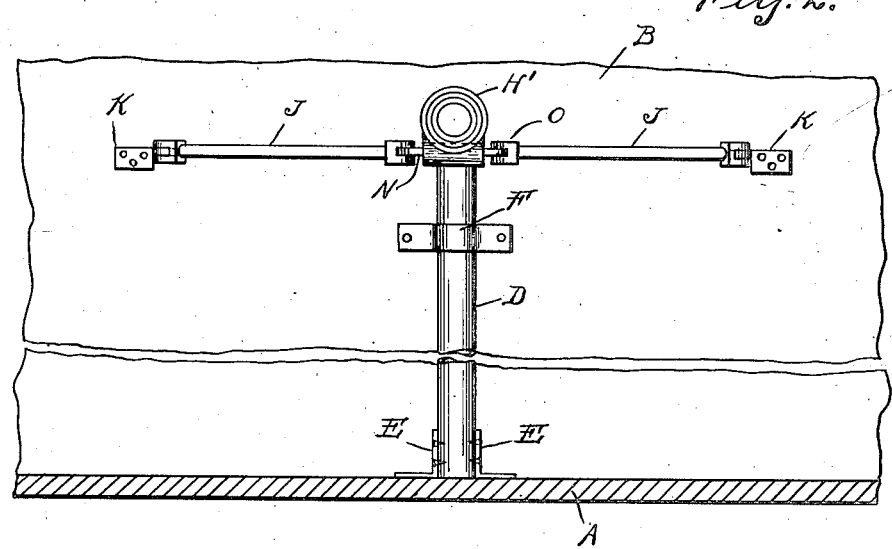
Figure 2 is a front view of the same.
Figure 3:
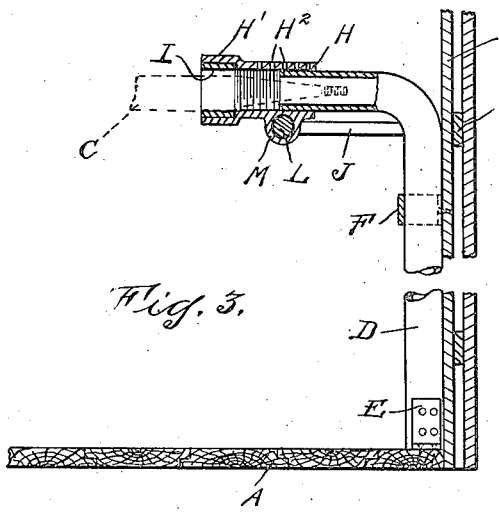
Figure 3 is a sectional elevation of the same, the section being taken upon the line 3—3 of Figure 1.
Figure 4:
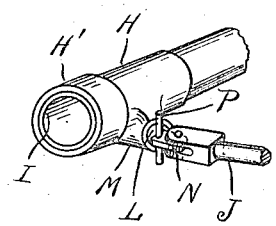
Figure 4 is a perspective detailed view of the axle-engaging member, showing the engagement of the brace members therewith.

In these views the reference character A designates the floor of a freight car or like conveyance, and B a side wall of the same. C is the axle of a motor vehicle, which it is desired to mount at an elevation within said conveyance. Against the wall B there is vertically set a pipe D, resting upon its lower end upon the floor A and secured to the latter by a pair of brackets E. At a suitable elevation above the floor, said pipe is secured to the wall B by a U-shaped bracket F. The upper portion of the pipe D is bent in a gradual curve to a perpendicular relation to the wall B, and the end thus projecting is screw threaded for engagement by a sleeve H. The outer end portion of the sleeve H is increased slightly in diameter to form a socket H', which socket is lined with babbitt, or other suitable material I to provide a seat for the spindle portion of the axle C. Preferably, this spindle, which according to general practice is gradually tapered, engages the seat I near its relatively thick base portion, the remaining portion of the spindle projecting centrally through the sleeve H and into the pipe D. In order that the location of the end of the pipe D within the sleeve H may be readily noted, there is provided in said sleeve a longitudinally spaced series of peep holes $H^2$.

To restrain the axle-engaging member H from horizontal movement parallel to the wall B, a pair of brace bars J are extended divergently from said member H to the wall B, being secured to said wall by suitably apertured nailing plates K, which are pivotally connected to said brace members. It is desirable that the brace members J be connected to the axle-engaging sleeve H in such a manner as to afford them a substantially universal swinging movement for the reason that it is usually best to register the fastening plates K with one of the belt rails B', and the elevation of the latter with respect to the floor A varies in different freight cars. Thus, in installing the apparatus in some cars the braces J may extend on a horizontal level with the sleeve H, and in other cars it may be advisable to extend the brace members at either an upward or downward inclination from the sleeve H. The desired freedom of motion for the brace bars J is secured by mounting a rock shaft L transversely of said sleeve in a bearing M formed integral with and beneath the sleeve and providing upon the respective ends of said rock shaft lugs N, which are pivotally engaged by the bifurcated adjacent ends O of the brace bars J. Thus, by a combined rotation of the rock shaft L and a swinging of the bars J about their pivotal connection with the lugs N, said bars may be extended at any desired angle with respect to the axis of the sleeve H. The rock shaft L may be retained in the bearing M by any suitable means, as, for example, a pair of pins P respectively engaging the lugs N at each side of said bearing.

When using the described construction, the motor vehicle to be supported at an elevation is raised in any suitable manner to the desired height, the wheels having been previously removed. The spindles of an axle of the vehicle are then engaged with the sleeve H, it being understood that the supporting means herein disclosed forms one of two pairs, the members comprising each pair being arranged oppositely against the respective sides of the freight car. After engagement of the axle spindles with the sleeve H, the latter are rotated relative to the pipe D so as to bring the vertical portions of said pipe to bear against the walls B of the car, and insure against any play of the axle transverse to said wall. The brackets E and F are then nailed respectively to the floor A and wall B to maintain the upright position of the pipe D. The brace bars J are now oppositely arranged at such an inclination as to register the fastening plates K with a belt rail B', into which nails are then driven through said fastening plates. The proper adjustment of the sleeve H according to the width of the car in which the apparatus is being installed is facilitated by observation of the end of the pipe D when the same is registered with any of the peep holes H².

Figure 7:
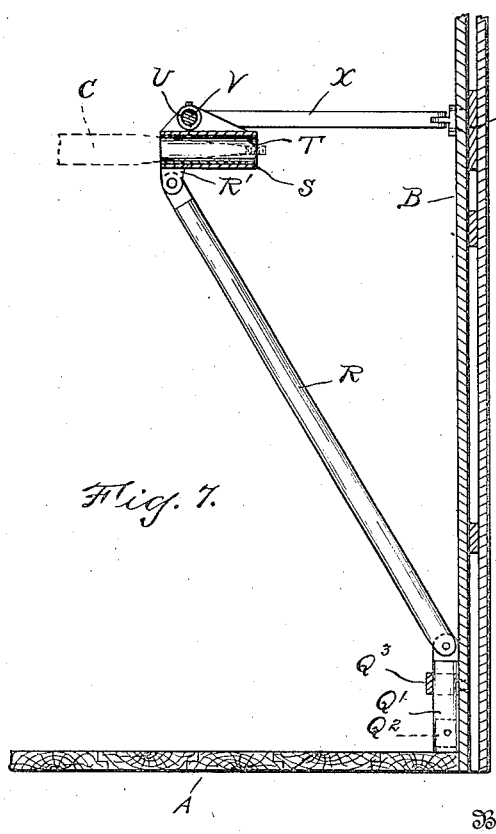
Figure 7 is a view of the same in side elevation.
Figure 8:
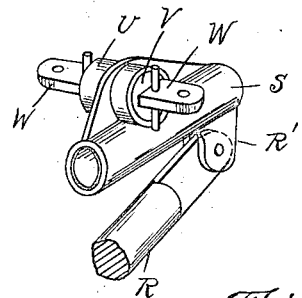
Figure 8 is a perspective detail of the axle-engaging member disclosed by Figures 5, 6 and 7.
Figure 5:
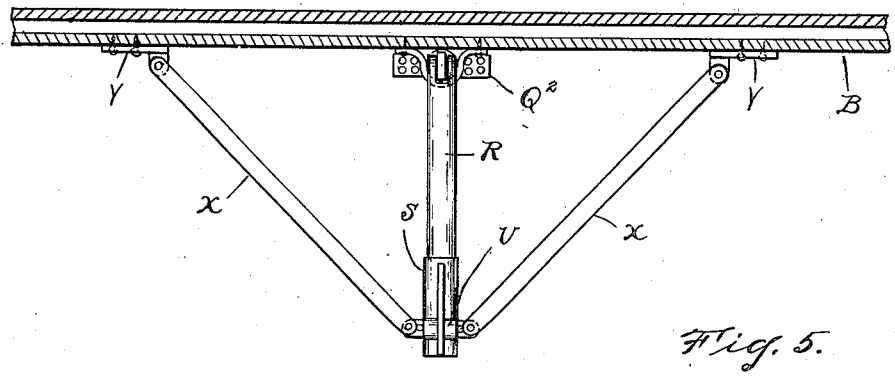
Figure 5 is a plan view of another form of the invention.
Figure 6:
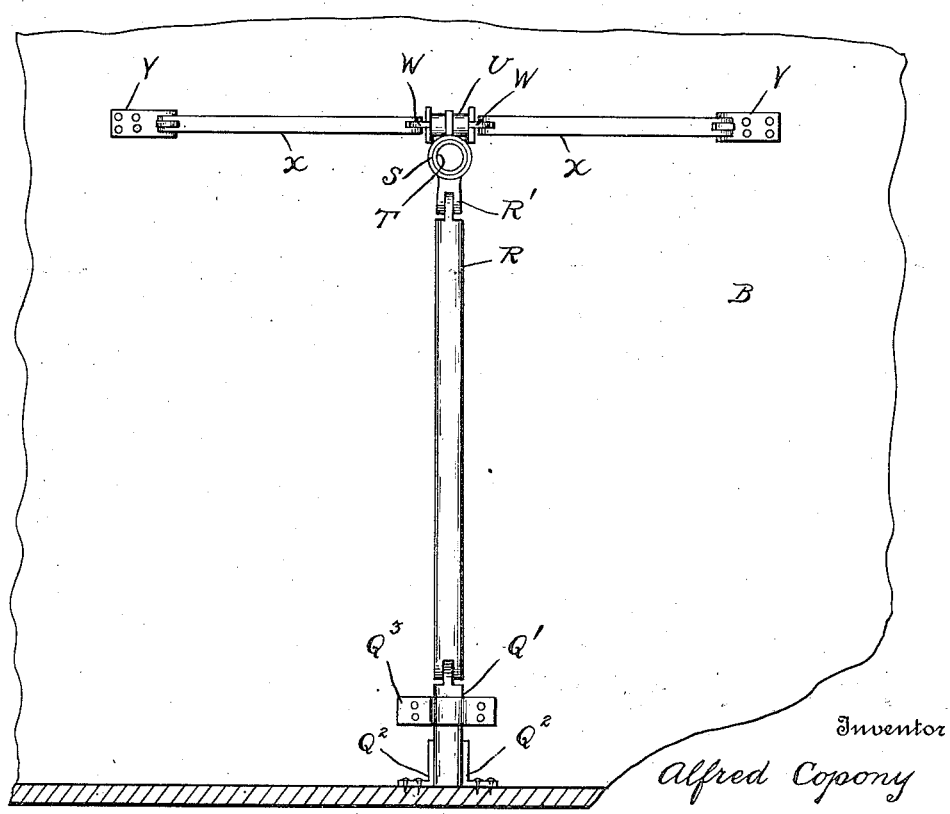
Figure 6 is a front view of the same.

In that form of the invention illustrated in Figures 5 to 8 inclusive, an anchorage bar Q' is vertically disposed against a side wall B of a freight car and is secured to the floor and wall of said car by the brackets Q² and Q³. To the upper end of said anchorage bar there is pivotally secured the lower end of a brace bar R, extending upwardly at an inclination to the wall B. At its upper end said brace bar is pivotally engaged between a pair of lugs R' integrally depending from a sleeve S, arranged with its axis perpendicular to the wall B and having a lining T of babbitt, or other suitable material, providing a seat for the spindle of the axle C, which engages in said sleeve. Integral with the sleeve S and transverse thereto above said sleeve there is formed a bearing U, in which is journaled the rock shaft V formed upon its respective extremities with the lugs W. Said lugs are engaged by a pair of divergent brace bars X, the remote ends of which pivotally carry fastening plates Y, adapted to be nailed or otherwise secured at proper points to the wall B.

In installing the construction just described, the motor vehicle to be supported is first raised slightly above the desired elevation. The spindle extremities of the axles of said vehicle are then engaged with the sleeves S. The vehicle is then gradually lowered, placing a strain on the brace bars R whereby the anchorage bars Q' are forced against the opposite side walls B, the spindles of the axle projecting into the sleeves S. Thus the apparatus automatically adjusts itself according to the width of the car wherein it is being carried. After the bars Q have been forced against the walls B, as described, they are secured in position by means of the brackets Q' and Q², and the brace bars X are then adjusted to register the fastening plates Y with a belt rail as indicated at Y', and said plates are nailed to said rail.

It will be noted that both of the described constructions possess the advantage of ready adjustability to compensate for variations in the width of different freight cars, the structure first described being manually adjustable, and the other form of the invention being of a self-adjusting nature. In both forms of the invention the materials employed are durable and the entire structure when not in use is collapsible, so that the apparatus may be returned to the shipper after a vehicle has reached its destination and may be repeatedly used without much deterioration.

In the following claims the term "axle engaging member" is to be understood as designating a member engaging the axle directly or engaging a portion of a wheel carried by the axle.

What I claim as my invention is:

1. A motor vehicle decking apparatus comprising an axle-engaging member spaced from a wall of a conveyance, a supporting member upon which said axle-engaging member is adjustable to and from the adjacent wall, and means in the horizontal plane of the axle restraining the axle-engaging member against lateral movement.

2. A motor vehicle decking apparatus comprising an axle-engaging member spaced from a wall of a conveyance, a supporting member upon which said axle-engaging member is adjustable to and from the adjacent wall, and a pair of brace arms pivotally connected to the axle-engaging member restraining the same against lateral movement.

3. A motor vehicle decking apparatus comprising an axle-engaging member spaced from a wall of a conveyance, a supporting member upon which said axle-engaging member is adjustable to and from the adjacent wall; and a pair of brace arms universally jointed to the axle-engaging member, restraining the same against lateral movement.

4. A motor vehicle decking apparatus comprising an axle-engaging member spaced from a wall of a conveyance, a supporting member upon which said axle-engaging member is adjustable to and from the adjacent wall, a rock-shaft transversely carried by the axle-engaging member, and a pair of brace arms pivotally engaging said rock-shaft and restraining the axle-engaging member against lateral movement.

5. A motor vehicle decking apparatus comprising a sleeve for engaging an extremity of a vehicle axle, a supporting brace for said sleeve pivotally connected thereto and extending downwardly therefrom, securing means for the lower end of said supporting brace, and a pair of braces resisting lateral movement of said sleeve.

6. A motor vehicle decking apparatus comprising a sleeve for engaging an extremity of a vehicle axle, a supporting brace for said sleeve pivotally connected thereto and extending downwardly therefrom, securing means for the lower end of said supporting brace, and a pair of braces pivotally connected to said sleeve and resisting lateral movement thereof.

7. A motor vehicle decking apparatus, comprising a sleeve for engaging an extremity of a vehicle axle, a supporting brace for said sleeve pivotally connected thereto and extending downwardly therefrom, securing means for the lower end of said supporting brace, and a pair of braces universally jointed to said sleeve and resisting lateral movement thereof.

8. A motor vehicle decking apparatus, comprising a sleeve for engaging an extremity of a vehicle axle, a supporting brace for said sleeve pivotally connected thereto and extending downwardly therefrom, a vertical member abutting against a side wall of a conveyance, engaged by the lower end of said supporting brace and transmitting the stress therefrom to the floor of the conveyance, and means restraining said sleeve against lateral movement.

9. A motor vehicle decking apparatus comprising a sleeve for engaging an extremity of a vehicle axle, a supporting brace for said sleeve pivotally connected thereto and extending downwardly therefrom, securing means for the lower end of said supporting brace, and a pair of braces resisting lateral movement of said sleeve adjustable about an axis transverse of the sleeve and further adjustable about axes substantially tangential to the sleeve.

10. A motor vehicle decking apparatus comprising an axle engaging member spaced from a wall of a conveyance and a self-adjusting supporting mechanism for said member comprising an abutment for engagement with a wall of the vehicle, and a support for said axle engaging member, pivotally engaged with said member and with said abutment.

11. In an automobile, decking system for freight cars, in combination, a brace member for supporting one axle of the automobile, said brace member including an arm extending from the side of the freight car, means for holding the said automobile axle, and means for adjusting said holding means along said arm to compensate for freight cars of different widths.

In testimony whereof I affix my signature.

ALFRED COPONY.